March 5, 1929.　　　H. E. TRACY　　　1,704,448
MULTIPLE MAGNETIC CHUCK
Filed Aug. 15, 1927
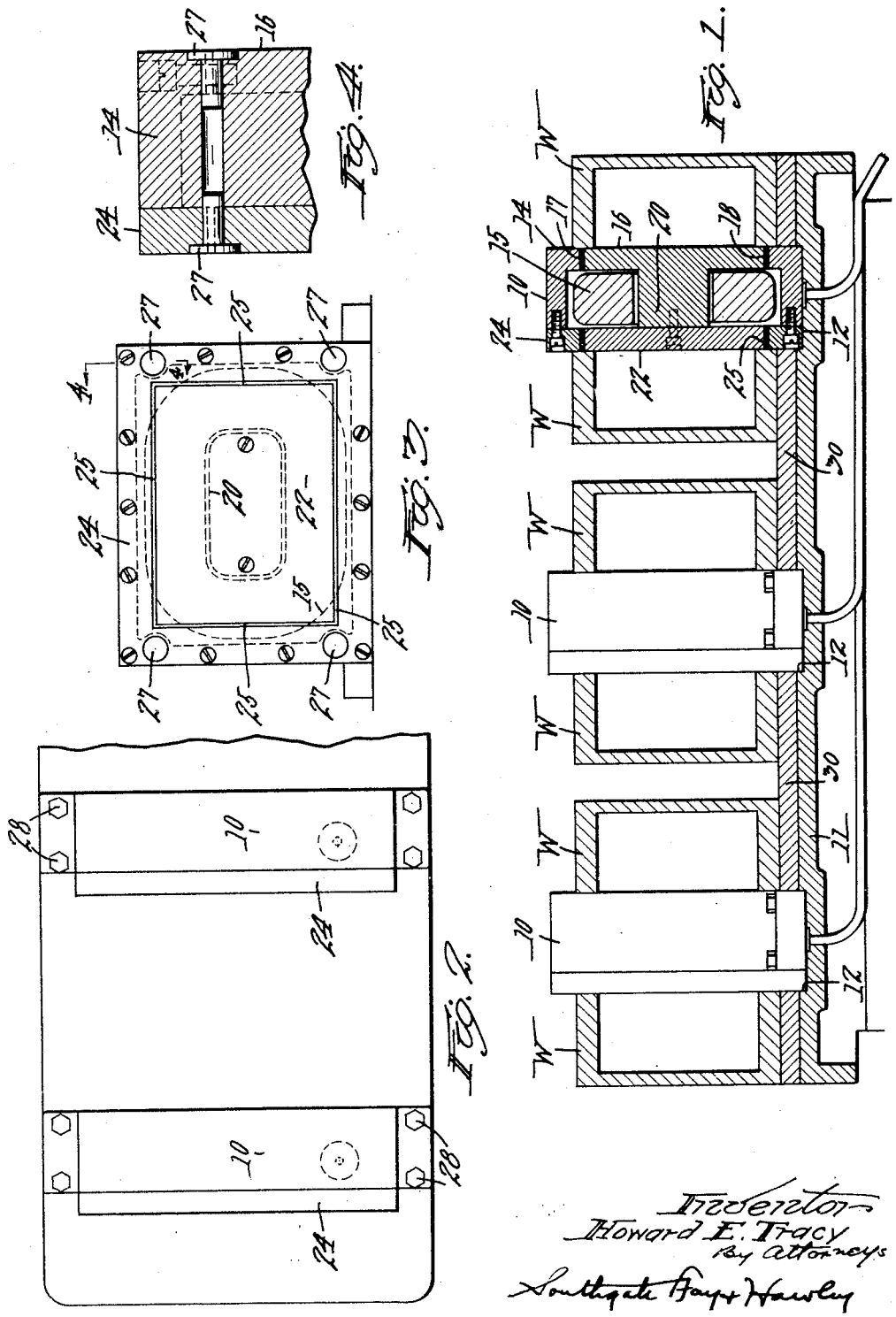

Patented Mar. 5, 1929.

1,704,448

UNITED STATES PATENT OFFICE.

HOWARD E. TRACY, OF WORCESTER, MASSACHUSETTS, ASSIGNOR TO O. S. WALKER CO., INC., OF WORCESTER, MASSACHUSETTS, A CORPORATION OF MASSACHUSETTS.

MULTIPLE MAGNETIC CHUCK.

Application filed August 15, 1927. Serial No. 213,009.

This invention relates to a magnetic chuck in which two or more work holding faces are provided.

It is the general object of my invention to provide an improved construction for a magnetic chuck, by which a plurality of pieces of work may be held simultaneously on separate work faces, preferably arranged parallel to each other.

A more specific object is to provide a magnetic chuck having work faces arranged in parallel pairs, each pair being energized by a single magnet coil or set of coils between the parallel work faces.

Another object of my invention is to provide a form of magnetic chuck which may be readily extended to any desired capacity by adding chuck units thereto.

My invention further relates to arrangements and combinations of parts which will be hereinafter described and more particularly pointed out in the appended claims.

A preferred form of the invention is shown in the drawings in which

Fig. 1 is a sectional end elevation of my improved chuck;

Fig. 2 is a partial plan view thereof;

Fig. 3 is a side elevation of one of the chuck units; and

Fig. 4 is a partial sectional end elevation thereof, taken along the line 4—4 of Fig. 3.

Referring to the drawings, I have shown a magnetic chuck comprising three chuck units 10, each capable of holding pieces of work against the parallel side faces thereof. These chuck units 10 are mounted on a base 11, which is shown as part of a machine table but which may be in any desired form. The base 11 is preferably grooved lengthwise as indicated at 12 to receive and position the lower edge portions of a plurality of the chuck members 10.

Each member 10 comprises a hollow rectangular casing 14 having a magnet coil 15 positioned therein. A work engaging pole piece 16 is centered in an opening 17 in the side face of the casing 14 and is secured therein by a packing 18 of babbitt or other non-magnetic material. The pole piece 16 has a core 20 projecting therefrom inside the casing 14 and within the magnet coil 15. A work engaging pole piece 22 is secured to the outer end of the core 20 and is centered in a rectangular face plate 24 by packing 25 as previously described. The plate 24 is firmly secured to the casing 14 and forms the second or left-hand work engaging face of the chuck unit, (as viewed in Fig. 1). Dowels 27 (Fig. 4) may be provided for centering the plate 24 on the casing 14, so that it may be readily removed and replaced without loss of adjustment.

It will be evident from Fig. 1 that the capacity of the chuck may be increased as desired by merely extending the base 11 and providing additional chuck units 10 mounted thereon and secured thereto, each chuck unit being held in position by bolts 28 (Fig. 2) extending through flanges on the casing 14 and threaded into the base 11. For holding long work, a number of chuck units may be positioned in alignment along each of the grooves in the base or table 11.

With the construction above described, it will be seen that the core 20 and the pole pieces 16 and 22 form a single magnetized assembly and that the plate 24 and rectangular casing 14 provide the return circuit for the magnetic lines of force.

When a piece of work W is applied against one of the faces of a chuck unit, it bridges across the non-magnetic packing 18 or 25 and is firmly held against the face of the chuck.

In the drawings, I have shown the three units of the chuck in use for holding channel beams in a vertical position for any desired operation. It will be noted that the beams are elevated by spacing members 30 so that their engaging portions bridge across the non-magnetic packing, as it will be evident that in this position the chuck will have its best holding capacity. The chuck is well adapted, however, to holding plates lying flat against the side faces of the chuck.

Having described the details of construction of my improved chuck, the simplicity and advantages thereof will be readily apparent. By my improved construction the capacity of the chuck for each magnetic unit is substantially doubled, as a single magnet coil energizes both faces of the chuck. The chuck units are simple and easily constructed and may be made interchangeable so that they may be easily and quickly replaced in case of injury.

Having thus described my invention and the advantages thereof, I do not wish to be limited to the details herein disclosed otherwise than as set forth in the claims, but what I claim is:

1. A double faced magnetic chuck unit comprising two separated work engaging face members, and a base adapted for attachment to a machine table, and a single magnet assembly positioned between said face members and operative to energize both of said face members.

2. A double faced magnetic chuck unit comprising parallel work engaging face members, and a base adapted for attachment to a machine table, and a single magnet assembly positioned between said parallel face members and operative to energize both of said face members.

3. A double faced magnetic chuck unit comprising a magnet coil, a core therefor, said core having work engaging pole piece extensions at each side of said coil, and a casing supporting said core and coil and providing a return magnetic circuit between said core extensions, said unit having a base portion below said core and coil and adapted for attachment to a machine table.

4. A double faced magnetic chuck unit comprising a magnet coil, a core therefor, said core having work engaging pole piece extensions at each side of said coil, and a casing supporting said core and coil and providing a return magnetic circuit between said core extensions, said core extensions and casing having adjacent portions in the same planes and collectively forming work engaging surfaces, said casing adapted to provide a base portion below said core and coil, for attachment to a machine table.

5. A magnetic chuck comprising a core, a magnet coil surrounding said core, work engaging pole pieces directly connected to each end of said core, and a casing surrounding said core and coil and having portions adjacent and in the plane of said work engaging pole pieces and separated therefrom by non-magnetic material positioning said core and pole pieces within said surrounding casing, said casing adapted to form a base for attachment of the chuck to a machine table.

6. A magnetic chuck unit comprising a core, a magnet coil surrounding said core, work engaging pole pieces directly connected to each end of said core, a casing surrounding said core and coil and having portions adjacent and in the plane of said work engaging pole pieces and separated therefrom by non-magnetic material positioning said core and pole pieces within said surrounding casing, said work engaging faces being parallel to each other, said casing adapted to form a base spaced from said pole pieces, for attachment to a machine table.

7. A magnetic chuck comprising a base and a chuck unit having a core, a magnet coil surrounding said core, work engaging pole pieces directly connected to each end of said core, a casing surrounding said core and coil and having portions adjacent and in the plane of said work engaging pole pieces and separated therefrom by non-magnetic material positioning said core and pole pieces within said surrounding casing, said chuck unit being secured on said base with its work engaging faces substantially perpendicular to said face.

8. A magnetic chuck comprising a base, and a plurality of chuck units mounted thereon and projecting upward therefrom, each of said chuck units having parallel work engaging faces, one at each side thereof, and the faces on the two opposite sides of each chuck unit being energized by a single magnet assembly within said unit and between said faces.

9. A magnetic chuck comprising a supporting base, and a plurality of chuck units secured to said base and projecting upward therefrom and each having two separate work engaging faces.

10. A magnetic chuck comprising a supporting base, and a plurality of chuck units secured to said base and projecting upward therefrom, each unit having parallel work engaging faces disposed perpendicular to said base.

11. A magnetic chuck, comprising a hollow casing, a face plate secured to one end of said casing, a work engaging pole piece mounted within one end of said casing, and substantially closing said end, a second work engaging pole piece mounted within said face plate and substantially closing the other end of said casing, a magnetic member comprising a core having a magnet coil therearound mounted within said casing and between said pole pieces, said pole pieces being spaced from the casing and the face plate by non-magnetic material.

12. A magnetic chuck comprising a hollow casing, a face plate secured to one end of said casing, a work engaging pole piece mounted within one end of said casing and substantially closing said end, a second work engaging pole piece mounted within said face plate and diametrically opposite said first pole piece, a magnetic member comprising a core having a magnet coil therearound mounted within said casing and between said pole pieces, said pole piece being spaced from the casing and the face plate by non-magnetic material, said casing providing a base to mount the chuck on a machine table.

In testimony whereof I have hereunto affixed my signature.

HOWARD E. TRACY.